2,269,068

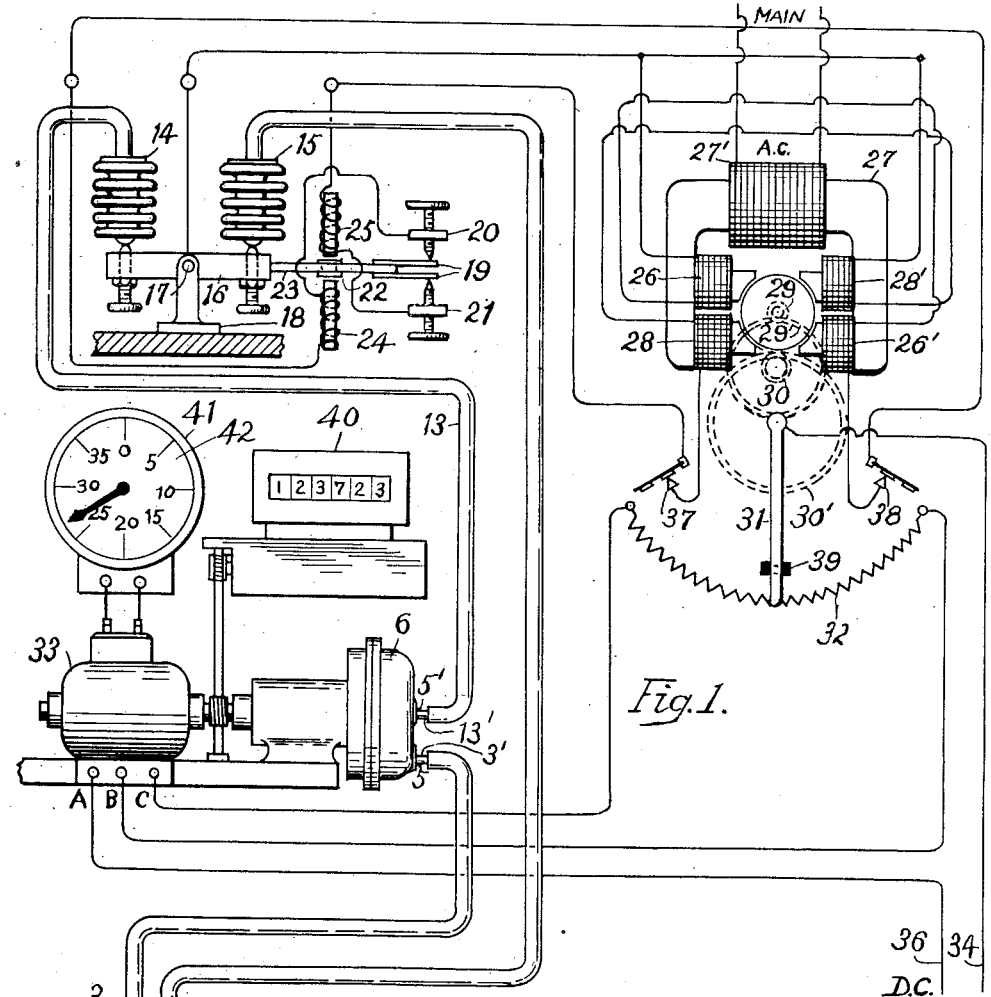
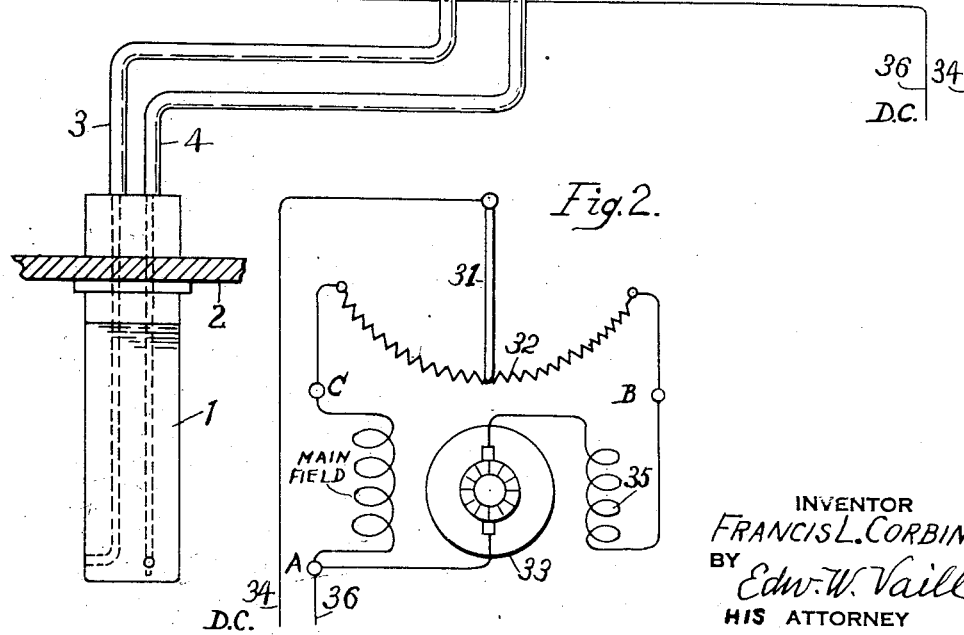
Fig.1.
Fig.2.
INVENTOR
FRANCIS L. CORBIN
BY Edw. W. Vaill
HIS ATTORNEY Jan. 6, 1942.　　　F. L. CORBIN　　　2,269,068
TRAVEL INDICATOR FOR SHIPS
Filed July 3, 1939　　　2 Sheets-Sheet 2
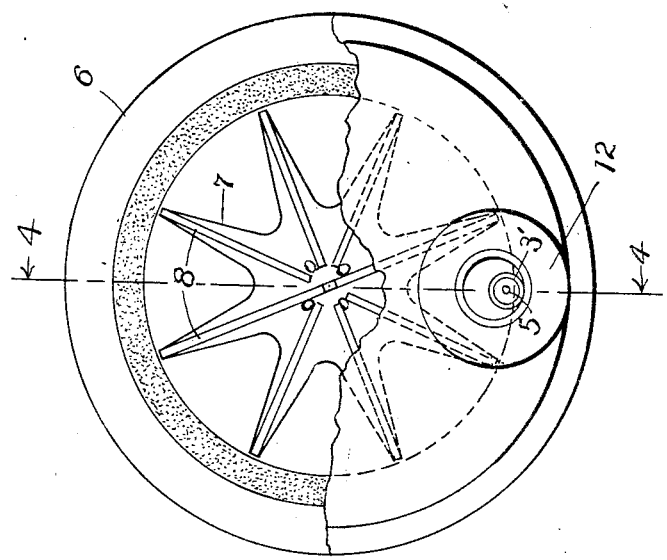
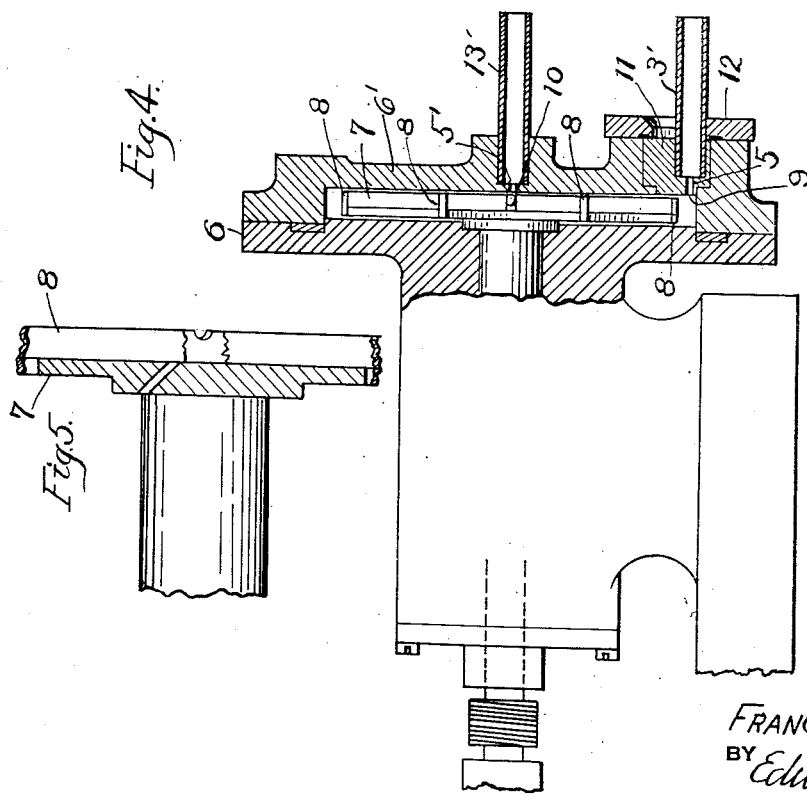
INVENTOR
FRANCIS L. CORBIN
BY Edw. W. Vaill
HIS ATTORNEY Patented Jan. 6, 1942

UNITED STATES PATENT OFFICE 2,269,068

TRAVEL INDICATOR FOR SHIPS

Francis L. Corbin, Chatham, N. J., assignor to Pitometer Log Corporation, a corporation of New York Application July 3, 1939, Serial No. 282,609

20 Claims. (Cl. 73—205)

This invention relates to apparatus for measuring and indicating the rates of speed of travel of fluids moving relatively to the carrier on which the apparatus is mounted, or of parts immersed in the same and when applied to ships, also the distance travelled by the ship on its normal course.

The object of said invention is to produce certain practical and valuable improvements over devices of a similar nature that have heretofore been patented. A patent granted to L. A. Dunajeff on April 10, 1923, No. 1,451,064, discloses and claims apparatus that involves fundamentally some of the physical and mathematical principles on which the present invention is based.

Primarily, a rod or tubes in the nature of a Pitot tube projects into the liquid whose relative velocity is to be measured, from a suitable support, as when employed to measure ship's speed and distance travelled, in knots or nautical miles.

It preferably projects from the outer surface of the hull of a ship or vessel and the Pitot tube is preferably one such as is described and claimed in United States patent to E. S. Cole, et al., No. 2,101,165, of December 7, 1937.

The present invention is not concerned with any particular form or design of Pitot tube or pressure measuring device but relates to apparatus and instruments that will efficiently and accurately indicate the rates and amounts of relative movement of a liquid passing the effective portions of a Pitot tube or other suitable measuring element.

This invention, therefore, involves improvements in operative parts that control indicating devices and their arrangements, including the use of additional parts that enable such devices as are disclosed in said patent to L. A. Dunajeff, No. 1,451,064, to be used with greater accuracy and reliability.

For a detailed description of the essentials of the present invention, reference may be had to the accompanying drawings, in which—

Figure 1 is a schematic diagram showing the main devices that should be included in the instant apparatus; Fig. 2 is a diagram showing the electrical connections within the driving device or electric motor for the pump or device that produces the necessary operating pressures; Fig. 3 is an end view of the pump showing a portion of the end cover or casing removed to disclose the rotor or impelling member or element and showing an adjustable outer port carrier; Fig. 4 is a diametral section of the main portion of the pump or pressure producing device that rotates according to the speed of the driving motor; and Fig. 5 is a somewhat enlarged view of the central or hub portion of the rotor shown in Fig. 4.

Referring to the drawings, the numeral 1 indicates a Pitot tube, rod or measuring element that projects through the hull, 2, of a ship or the wall of a conduit or channel for a flowing fluid of which the relative velocities are to be measured.

Extending upward from said measuring element, 1, are a plurality of conduits or tubes, 3 and 4, that are connected therewith in a manner that is similar to that illustrated and described in a prior patent to E. S. Cole et al., No. 2,101,165, of December 7, 1937.

One of said tubes that connects with the dynamic orifice of the rod, 1, as indicated by the numeral 3, passes to and is connected with the outer pressure port, 5, provided near the periphery of the pump, 6, as shown more in detail in Fig. 4. The inner port, 5', is centralized or axially disposed in the end casing 6' of the pump, 6, and communicates with the nipple, 13'.

The pump, 6, comprises a rotor or impeller, 7, having radial blades, 8, to rotate the enclosed fluid, usually water.

Referring to Figs. 3 and 4, it will be seen that the orifices or ports, 5 and 5', that connect with the connecting nipples, 3' and 13', are small in diameter and that the planes of their orifices at 9 and 10 are parallel to the plane of rotation of the impeller, 7, and to the transverse motion of the contained fluid. That disposition of the orifices greatly reduces the liability of causing eddy currents or other disturbances that would tend to produce detrimental effects on the indicated resultant pressures and is effective to produce accurate indications of speed on the indicator dial, 42.

In said figures it will be seen that the outer port, 5, and nipple, 3', are carried eccentrically in a rotatable plug or inset piece, 11, that is retained in position by a plate or collar, 12. That arrangement allows the inset piece, 11, to be turned on its axis so that the port, 5, and its orifice, 9, may be positioned at various radial distances from the axis of the impeller, 7, and thereby enable the pressure induced by the impeller to be adjusted to the best factor for the various velocities of the ship.

The nipple, 13', on the impelling device, 6, is connected with a conduit or tube, 13, that communicates with an expansible container or bellows, indicated at 14. The conduit or tube, 8, runs directly to an expansible container or bellows, 15. Both of said bellows have their movable ends bearing upon a movable lever or bar, 16, pivoted on a fulcrum at 17, carried on a suitable support, 18. The outer or right-hand end of said lever is provided with an arm, 23, carrying a contact member, 19, the parts of which are adapted to engage two stationary, adjustable contact members, 20 and 21. An armature, 22, of magnetic material is carried on the arm, 23, that supports the contact, 19, and with the electro-magnetic coils, 24 and 25, constitutes means for eliminating objectionable action of "hunting" of the rotor speed in the impelling device, 6.

The coil, 24, is connected in series with contact, 20, so that whenever the contact, 19, engages it, electric current passes through said coil. That energizes the magnet and exerts a force on contact arm, 23, acting to open or disengage contacts, 19 and 20, if said force is sufficient. When the pressure difference in the containers, 14 and 15 is large said magnetic force is not sufficient to disengage contacts, 19 and 20, and then the current acts continuously on the driving motor, 27, for the controlling rheostat of motor, 33, that drives the pressure device, 6. When the pressure difference in containers, 14 and 15, is small, the magnet, 24, opens contacts, 19 and 20, instantaneously and since said magnet is then de-energized the contacts immediately close again. That results in a rapid opening and closing of the contacts, 19 and 20, which has the effect of slowing down the regulating action of the rheostat motor, 27.

A similar action takes place as regards the contacts, 19 and 21, through the energization of coil or magnet, 25, if the pressure difference in the containers, 14 and 15, is reversed.

By said arrangement the driving motor and the impelling or pressure device are caused to operate at a substantially uniform speed that is proportional to the velocity of the fluid past the Pitot tube.

The contact member, 20, is electrically connected with one pair of shading coils, 26 and 26', of the reversible motor, 27, and the contact member, 21, is electrically connected with the shading coils, 28 and 28', of the motor, 27. The coil 27', energizes the field of the motor, 27 from an alternating current source. The coils, 26, 26', 28, and 28', are so applied to the magnetic poles of the motor, 27, that when one pair is energized by the alternating current passing therethrough, the rotor of the motor will rotate in one direction and when the other pair of coils is energized the rotor will rotate in the reverse direction. The energizing coil 27' of the motor 27, provides the power to drive its rotor in either direction. It will be seen that if contact 20 is closed, a circuit through the shading coils 26 and 26' will be completed if limiting switch at 38 is closed. Similarly, closure of contact 21, completes the circuit through the shading coils 28 and 28' if limiting switch 37 is closed. The independent closings at said contacts 20 and 21, obviously, cause induced currents to flow through the respective pairs of shading coils, which currents vary the resultant action of the alternating magnetic flux passing through the rotor of the motor 27. That results in "split phase" or two phase fluxes that turn the rotor in one direction or the other to change the amount of resistance in the rheostat 32. Any suitable type of motor for that purpose may be employed. In the present instance it is shown as a single phase A. C. motor.

As indicated at the right-hand side of Fig. 1, the rotor of the A. C. motor, 27, is provided with a suitable device, such as a pinion, 29, gear, 29', pinion 30, and gear, 30', for transmitting the movement of said rotor to a contact arm, 31, that controls the action of a resistance or rheostat, 32, that is included in the field and armature circuits of the driving motor, 33, said rheostat being electrically connected with the terminals or binding posts, B and C. The arm, 31, of the rheostat, 32, is electrically connected with the main lead, 34, that supplies current to the driving motor, 33. The series or compound field coil, 35, and the armature of said motor are connected in series with a variable portion of said rheostat, 32, and with the opposite lead 36.

The speed controlling connections for the driving motor, 33, are indicated in detail in Fig. 2. In that figure the current flows from the main lead, 34, into the rheostat arm, 31, and then into portions of the rheostat, 32, from one portion of which it passes through the main field coil, C—A, to the opposite lead, 36, while from the other portion of the rheostat, 32, it passes through the terminal, B, through the series field coil, 35, and the armature of the motor, 33, to the opposite lead, 36.

It will be noticed that as the contact arm, 31, moves clock-wise, less and less resistance will be included in the main field coil of the motor, causing it to reduce the speed of the armature rotation, while at the same time the resistance in the armature circuit is increased which also aids in reducing the speed of armature rotation. Movement of the contact arm, 31, in a counter-clockwise direction has the opposite effect and speeds up the armature rotation.

At the right hand side of Fig. 1, limiting switches, 37 and 38, are indicated. Those switches are operated by small insulating projections, 39, on the contact arm, 31, or otherwise, to open the switches, 37 and 38, respectively, when said contact arm is practically at either end of the resistance element of the rheostat, 32. They are simply one form of convenient devices for preventing over-running of the rheostat arm, 31, and may be of any suitable or commercial form.

The driving motor, 33, is connected with any preferred type of revolution counter, 40, that is preferably calibrated to indicate distance in miles travelled. Such devices are well known and need not be more fully described herein. Any suitable transmitting device may be driven by the shaft of the motor, 33, which is also connected electrically or mechanically with a speed indicator or speedometer, 41, on the scale or dial of which, as at 42, the relative velocity between the fluid and the measuring element, 1, will be indicated, according to which one moves relative to the other.

The operation of my device is as follows: The measuring element, 1, being stationary relative to the fluid in which it is immersed and the pump, 6, is not operating or is stopped, the pressures in the bellows, 14 and 15, will be equal. When the ship advances on its course or the fluid moves past the measuring element, 1, the dynamic pressure produced thereby is transmitted through tubes, 3 and 13, to the bellows, 14, thereby closing contacts, 19 and 20, to adjust the rheostat, 32, and start the armature of motor, 33, rotating. It will soon rotate at a rate to cause a pump speed that will produce a counter-pressure component substantially equal to the dynamic pressure component in the measuring element, 1. With the pump running at that speed the lever, 16, will move to a neutral position and neither of the contacts, 20 or 21, will be engaged by the contact, 19.

When the ship's speed is reduced or the fluid passes the measuring element more slowly, the lever, 16, will be deflected in the opposite direction to close the contacts, 19 and 21, due to the reduction of the pressure in the bellows, 14, which will reverse the motor, 27, cause the rheostat arm, 31, to move in the opposite direction, slow down the motor, 33, and the pump, 6. Thus the speed of the pump-impeller, 7, is automatically controlled in such a way that the pressure developed in the pump, 6, always substantially balances the dynamic component of the pressure acting in the measuring element, 1.

It should be noted that the pressures in the containers or bellows, 14 and 15, are always substantially equal to the pressure at the static orifice of the rod, 1, and in the tube, 4. Those pressures are substantially constant so long as the bellows are at a uniform depth below the surface of the surrounding fluid or water or so long as the static pressure does not change when employed for other uses. That obviates causing any greater pressures in the bellows that might strain or distort them and, furthermore, it makes the lever, 16, more sensitive to changes of pressure in the bellows, 14, until the pump, 6, has produced a pressure equal to the extra dynamic pressure component to make the pressures in both bellows the same as the static pressure. Those are very valuable advantages in increasing the dependability and accuracy of the indicator.

Various changes and the employment of other commercial devices may be used therewith without departing from the essentials of this invention as set forth in the appended claims.

The improved pump, disclosed but not claimed per se in this application, is claimed in my divisional application Serial No. 307,640 filed December 5, 1939.

What I claim and desire to protect by Letters Patent is:

1. In an indicator, the combination with pressure tubes, a fluid-pressure producing device connected with one tube, a driving motor for said pressure device, pressure responsive containers connected respectively with the intake of said device and with a static orifice of another of said tubes, electric contacts controlled by said containers, electro-magnetic coils in series with two of said contacts and exerting forces to separate the contacts, the electric current through which is interrupted by the action of said coils when the opposing force is insufficient, and means including a speed controlling device for determining the speed of said driving motor through the action of said contacts, for the purposes set forth.

2. In an indicator, the combination with pressure tubes, a fluid-pressure producing device having its outlet connected with a dynamic orifice of one of said tubes, a driving motor for said pressure device, pressure responsive containers connected respectively with the intake of said pressure device and with a static orifice of another of said tubes, contacts adapted to be opened and closed by the differences in pressure between said containers, the electric current through said contacts being established and stopped thereby, a rheostat that controls the speed of said driving motor, and a reversible rheostat motor for varying the amount of resistance introduced into the circuit of said driving motor by said rheostat and controlled by said contacts to increase or decrease the speed of said driving motor, for the purposes set forth.

3. In an indicator, the combination with pressure tubes, a fluid-pressure producing device connected with a dynamic orifice of one of said tubes, a driving motor for said pressure device, a rotation indicator connected therewith, pressure responsive containers communicating respectively with said pressure producing device and a static orifice of another of said tubes, a pivoted lever upon which said containers act, electric circuits including contacts operated by said lever, electro-magnets operative upon said lever and positioned to oppose the closing of said contacts, the electric current passing through said magnets causing said contacts to separate when opposition thereto is not sufficient to overcome the attraction of said magnets, a rheostat that controls the speed of said driving motor, and a reversible motor controlled by said circuits and operative upon said rheostat for varying the amount of resistance introduced into the power input to said driving motor by said rheostat, for the purposes set forth.

4. In an indicator, the combination with a primary device of the kind producing fluid pressures of different magnitudes the pressure difference between which is indicative of the flow of a fluid relative to said device, of pressure producing means arranged to produce a back pressure opposing the fluid pressure of greater magnitude to reduce it and create a resultant pressure of substantially the same value as that of the fluid pressure of lesser magnitude, controlling means responsive to the difference in pressure between said pressure of lesser magnitude and said resultant pressure for controlling the operation of said pressure producing means to maintain said difference in pressure at substantially zero value, and indicating means actuated by operation of said pressure producing means for indicating flow of said fluid relative to said primary device.

5. In an indicator, the combination with a primary device of the kind having a static pressure line and a total pressure line the pressures in which are respectively indicative of the static and total pressures of a fluid flowing relative to said device, of pressure producing means arranged to produce a back pressure opposing the pressure in said total pressure line to reduce it and create a resultant pressure of substantially the same value as that in said static pressure line, controlling means responsive to the difference in pressure between said static pressure line and said resultant pressure for controlling the operation of said pressure producing means to maintain said difference in pressure at substantially zero value, and indicating means actuated by operation of said pressure producing means for indicating flow of said fluid relative to said primary device.

6. In an indicator, the combination with a high pressure tube and a low pressure tube, each having an inlet orifice, of two independent expansible containers communicating respectively with said tubes, a pivoted lever upon which the movable parts of said containers are active, a rotary pressure producing device having a radially inner port and a radially outer port for producing continuous variable fluid pressures opposed to the pressure from the orifice of said high pressure tube, one of said containers having its interior communicating with the orifice of the low pressure tube and the interior of the other of said containers communicating with the radially inner port of said pressure producing device, the radially outer port of said device communicating with the orifice of said high pressure tube, means for driving said pressure device, electric contacts controlled by said lever, electric circuits adapted to be opened and closed by said contacts due to movements of said lever, means in said circuits respectively and operative upon said driving means for controlling the speed of operation of said rotary device to maintain substantially equal pressures in said containers and equal forces on said lever, and an indicator connected with said driving means to give its rotational characteristics.

7. In an indicator, the combination with fluid pressure tubes having static and dynamic orifices respectively, of two independent expansible containers communicating respectively with said tubes, a pivoted lever upon which the movable parts of said containers are active, a rotary pressure producing device having a radially inner port and a radially outer port for producing continuous variable fluid pressures opposed to the pressure from the dynamic orifice of one of said tubes, one of said containers having its interior communicating with the static orifice of the other of said tubes and the interior of the other of said containers communicating with the radially inner port of said pressure producing device, the radially outer port of said device communicating with the dynamic orifice of the first named tube, means for driving said pressure device, electric contacts controlled by said lever, electric circuits adapted to be opened and closed by said contacts due to movements of said lever, means in said circuits respectively and operative upon said driving means for controlling the speed of operation of said rotary device to maintain substantially equal pressures in said containers and equal forces on said lever, and an indicator connected with said driving means to give its rotational characteristics.

8. In an indicator, the combination with a primary device of the kind having a high pressure line and a low pressure line, the pressure differential between which is indicative of the flow of a fluid relative to said device, of expansible containers communicating respectively with said lines, a rotary pressure producing device located in said high pressure line for producing a back pressure therein to create a resultant pressure acting in the container communicating with said high pressure line, driving means for operating said rotary device, controlling means including a member movable in response to the pressure difference between said containers for regulating the speed of operation of said rotary device to balance the pressures between said containers by appropriate change in said back pressure, and indicating means actuated by rotation of said driving means for indicating the flow of said fluid relative to said primary device.

9. In an indicator, the combination with a primary device of the kind having a high pressure line and a low pressure line, the pressure differential between which is indicative of the flow of a fluid relative to said device, of expansible containers communicating respectively with said lines, a rotary pressure producing device having a radially inner port and a radially outer port, said pressure producing device being located in said high pressure line with the radially inner port communicating with the container associated with the high pressure line and with the radially outer port communicating with the inlet end of said high pressure line, said pressure producing device being operative to produce a back pressure in the high pressure line for creating a resultant pressure substantially equal to that in the low pressure container, driving means for operating said pressure producing device, controlling means including a member movable in response to the pressure difference between said containers for regulating the speed of operation of said rotary device to balance the pressures between said containers by appropriate change in said back pressure, and indicating means actuated by rotation of said driving means for indicating the flow of said fluid relative to said primary device.

10. In an indicator, the combination with a primary device of the kind having a high pressure line and a low pressure line, the pressure differential between which is indicative of the flow of a fluid relative to said device, of expansible containers communicating respectively with said lines, a rotary pressure producing device having a radially inner port and a radially outer port, said pressure producing device being located in said high pressure line with the radially inner port communicating with the container associated with the high pressure line and with the radially outer port communicating with the inlet end of said high pressure line, said pressure producing device being operative to produce a back pressure line for creating a resultant pressure substantially equal to that in the low pressure container, one of said ports being adjustable radially, whereby to vary the value of the back pressure created at a given speed of operation of said pressure producing device, driving means for operating said pressure producing device, controlling means including a member movable in response to the pressure difference between said containers for regulating the speed of operation of said rotary device to balance the pressures between said containers by appropriate change in said back pressure, and indicating means actuated by rotation of said driving means for indicating the flow of said fluid relative to said primary device.

11. In an indicator, a primary device producing different fluid pressure indicative of the flow of a fluid relative to said device, a pressure producing device operable at different rates for producing a continuous but variable balancing pressure tending to balance said different fluid pressures, means for varying the action of said pressure producing device, an indicator to show the rate of action thereof, means for producing differential forces due to differences between said fluid pressures, control means sensitive to said differential forces for controlling the rate of action of said pressure producing device, and means operable only after movement of said control means in response to said differential forces for opposing said differential forces.

12. The combination, with fluid pressure lines, of a first means operable in response to differential pressures between said lines created by excess pressure in either line relative to the other line to restore pressure balance therebetween, and a second means automatically operable to momentarily interrupt the action of said first means and produce intermittent action thereof whenever the condition of pressure balance is approached following any such differential pressure, due to the action of said first means but before such balance is fully restored.

13. The combination, with fluid pressure lines, of a first means operable in response to differential pressures between said lines created by excess pressure in either line relative to the other line to restore pressure balance therebetween, and a second means automatically operable to momentarily interrupt the action of said first means and produce intermittent action thereof whenever the condition of pressure balance is approached following any such differential pressure, due to the action of said first means but before such balance is fully restored, said second means including parts adjustable to determine the maximum value of the differential pressure at which said second means will interrupt the action of said first means.

14. The combination, with fluid pressure lines, of a control device having a neutral position corresponding to equal pressures in said lines and including a member movable in response to differential pressure between said lines, a first means operable in response to movement of said member away from its neutral position for restoring pressure balance between said lines, and a second means actuated by movement of said member away from its neutral position, said second means acting on said member in opposition to said differential pressure and being effective to momentarily return said member to its neutral position whenever a condition of restored balance is approached due to operation of said first means but before such balance is restored, whereby to effect final balancing of said pressures by a series of intermittent operations of said first means.

15. The combination with fluid pressure lines, of a control device having a neutral position corresponding to equal pressures in said lines and including a member movable in response to a first force created by differential pressure between said lines, a first means operable in response to movement of said member away from said neutral position for restoring pressure balance between said lines and a second means actuated by the same movement of said member to create a second force tending to return said member to its neutral position, said second force being overcome by said first force whenever the value of said differential pressure is relatively high and said first force being overcome by said second force to momentarily return said member to its neutral position whenever said differential pressure is reduced to a relatively low value due to the action of said first means but before a pressure balance is restored.

16. The combination with fluid pressure lines, of a control device having a neutral position corresponding to equal pressures in said lines and including a member movable in response to a first force created by differential pressure therebetween, a first means operable in response to movement of said member away from said neutral position for restoring pressure balance between said lines and a second means actuated by the same movement of said member to create a second force tending to return said member to its neutral position, said second force being overcome by said first force whenever the value of said differential pressure is relatively high and said first force being overcome by said second force to momentarily return said member to its neutral position whenever said differential pressure is reduced to a relatively low value due to the action of said first means but before a pressure balance is restored, said second means including parts adjustable to determine the maximum value of said differential pressure at which said second force is operative to momentarily return said member to its neutral position against the action of said first force.

17. The combination, with fluid pressure lines, of a control device including a member movable in response to a first force created by differential fluid pressure between said lines, an electric circuit, means responsive to the condition of said circuit for producing a fluid balancing pressure tending to balance said differential pressure and diminish said force, contacts associated with said member for opening and closing said circuit, said force acting in a direction tending to keep said contacts closed, and means in said circuit for producing a second force opposing said first force and tending to open said contacts, the last mentioned means being operable to produce said second force only when said contacts are closed.

18. The combination, with two fluid pressure lines, of a control device including a member, movable from a mid-position corresponding to equal pressures in said lines to regulating positions on either side of said mid-position in response to differential pressures between said lines, two electric circuits each having contacts associated with said member for opening and closing the respective circuits, said contacts being arranged so that only one or the other of said circuits is energized due to the action of said contacts upon movement of said member to either side of said mid-position, means operable whenever either one of said circuits is closed and the other of said circuits is open to produce a fluid balancing pressure tending to diminish said differential pressure and restore the pressure balance between said lines, and means in each of said circuits and energized whenever the respective circuit is closed for producing a force acting on said member tending to return it to its mid-position in opposition to said differential pressure.

19. The combination, with two fluid pressure lines, of a control device including a member movable from a mid-position corresponding to equal pressures in said lines to regulating positions on either side of said mid-position in response to differential pressures between said lines, two electric circuits each having contacts associated with said member for opening and closing the respective circuits, said contacts being arranged so that only one or the other of said circuits is energized due to the action of said contacts upon movement of said member to either side of said mid-position, means operable whenever either one of said circuits is closed and the other of said circuits is open to produce a fluid balancing pressure tending to diminish said differential pressure and restore the pressure balance between said lines, and means in each of said circuits and energized whenever the respective circuit is closed for producing a force acting on said member tending to return it to its mid-position in opposition to said differential pressure, said contacts being adjustable to permit a predetermined range of movement away from said mid-position under the influence of said differential pressures before the condition of one or the other of said circuits is changed.

20. In an indicator, the combination with a primary device having a high pressure line and a low pressure line, the pressure difference between which is indicative of the flow of a fluid relative to said device, of a rotary variable speed device for producing a back pressure varying in fixed relation with variations in the speed of rotation of the device and opposing the pressure in said high pressure line to reduce it to substantially the same value as that in the low pressure line, a controller for varying the speed of said rotary device, means including a member movable in response to a pressure differential between the pressure in said low pressure line and the reduced pressure in said high pressure line, said member having a mid-position corresponding to a balance between said pressures, two electric circuits each having contacts associated with said member for opening and closing the respective circuits, said contacts being arranged so that only one or the other of said circuits is energized due to the action of said contacts upon movement of said member to either side of said mid-position, means associated with said circuits and operable whenever either one of said circuits is open and the other of the circuits is closed to adjust said controller so as to vary the speed of said rotary device to tend to reduce the pressure differential acting on said member, means in each of said circuits and energized whenever the respective circuit is closed for producing a force acting on said member and tending to return it to its mid-position in opposition to said pressure differential, and indicating means for showing the rotative characteristics of said rotary device.

FRANCIS L. CORBIN.